United States Patent [19]

Egalon et al.

[11] Patent Number: 5,381,493
[45] Date of Patent: Jan. 10, 1995

[54] OPTICAL FIBER STRAIN SENSOR WITH IMPROVED LINEARITY RANGE

[75] Inventors: Claudio O. Egalon; Robert S. Rogowski, both of Hampton, Va.

[73] Assignee: The United States of America as represented by the Administrator of the National Aeronautics and Space Administration, Washington, D.C.

[21] Appl. No.: 223,931

[22] Filed: Dec. 21, 1992

[51] Int. Cl.⁶ .................................... G02B 6/16
[52] U.S. Cl. ............................ 385/13; 385/28; 385/123; 250/227.16
[58] Field of Search .............. 385/13, 3, 12, 122, 385/123, 28; 250/227.14, 227.16

[56] References Cited

U.S. PATENT DOCUMENTS

| | | | |
|---|---|---|---|
| 4,503,078 | 7/1985 | Lagakos et al. | 367/149 |
| 4,525,818 | 6/1985 | Cielo et al. | 367/149 |
| 4,918,305 | 4/1990 | Wlodarczyk et al. | 250/227.14 |
| 5,109,443 | 4/1992 | Hill et al. | 385/13 |
| 5,135,295 | 8/1992 | Jen et al. | 385/13 |
| 5,201,015 | 4/1993 | von Bieren et al. | 385/13 |
| 5,208,877 | 5/1993 | Murphy et al. | 385/12 |
| 5,240,643 | 8/1993 | Buckley et al. | 252/408.1 |

OTHER PUBLICATIONS

C. D. Butter et al., Applied Optics, "Fiber Optics Strain Gauge," vol. 17, No. 18, 15 Sep. 1978, pp. 2867–2869.
G. B. Hocker, Applied Optics, "Fiber Optic Acoustic Sensors with Composite Structure: An Anaylsis," vol. 18, No. 21, 1 Nov. 1979, pp. 3679–3683.
C. K. Asawa et al., Electronic Letters, "High-Sensitivity Fibre-Optic Sensors for Measuring Structural Distortion," vol. 18, No. 9, 29 Apr. 1982, pp. 362–364.

Primary Examiner—Frank Gonzalez
Attorney, Agent, or Firm—Kimberly A. Chasteen

[57] ABSTRACT

A strain sensor is constructed from a two mode optical fiber. When the optical fiber is surface mounted in a straight line and the object to which the optical fiber is mounted is subjected to strain within a predetermined range, the light intensity of any point at the output of the optical fiber will have a linear relationship to strain, provided the following equation is less than 0.17 radians $$\delta\phi_{01} - \delta\phi_{11} = n_{co} \frac{\Delta k L S_1}{V^2} \sum_{l=0}^{1} (-1)^{l+1} U_{l1}^2 (1 + 2\eta_{l1}v_f - (3 - 4\eta_{l1})n_{co}^2 P_{ef}),$$

where $n_{co}$ represents the refractive index of the core, k represents the wavenumber of the light, L represents the length of the optical fiber, $S_1$ represents axial strain, V is $$ak\sqrt{n_{co}^2 - n_{cla}^2},$$

U is a solution to the eigenvalue equation of the optical fiber, $v_f$ represents the Poisson ratio, $P_{ef}$ represents the effective strain-optic coefficient of the optical fiber and $\eta_{ln}$ represents $$\eta_{ln} = \frac{K_l^2}{K_{l+1}K_{l-1}},$$

where $K_l$ is the modified Bessel function of second kind of order/with argument given by $$W_{ln} = \sqrt{V^2 - U_{ln}^2},$$

where $$V = ak\sqrt{n_{co}^2 - n_{cla}^2} \cdot I.$$

4 Claims, 1 Drawing Sheet

OPTICAL FIBER STRAIN SENSOR WITH IMPROVED LINEARITY RANGE

CROSS-REFERENCE TO RELATED APPLICATION

This application is related to the following U.S. patent application filed on the same date and assigned to the same assignee by the same inventors: DISCRETE OPTICAL FIBER STRAIN SENSOR which is incorporated herein by reference.

BACKGROUND OF THE INVENTION

1. Field of the Invention

The present invention is directed to an optical fiber strain sensor and, more particularly, to an optical fiber strain sensor in which received light intensity changes linearly with respect to strain over a relatively wide range of strain.

2. Description of the Related Art

A known technique for measuring strain is to use the light transmitted by an optical fiber affixed to an object under strain. Conventionally, the modal pattern produced by light at the receiving end of an optical fiber under strain is monitored to detect changes in the modal pattern. The changes in the pattern are caused by changes in the optical path length of the light in the fiber due to changes in the index of refraction n and the propagation constants of each fiber mode. As a result, the modal phase term, $\beta_{ln}z$, of the electric field is shifted by an amount $\delta\phi$. This phase shift phenomenon has been theoretically studied and experimentally used in applications that involve determination of strain using single mode, few mode and multimode fibers.

A single mode fiber is the simplest kind of strain sensor using optical fibers. It is basically an interferometer that compares the modal phase shift of two fibers: one fiber is subjected to strain and the other serves as a reference. Such a device is described in "Fiber Optics Strain Gauge" by Butter et al. in *Applied Optics*, vol. 17, pages 2867–2869, September 1978, for surface mounted sensors using "weakly guiding" optical fibers. Another example of strain sensors using weakly guiding optical fibers was described in "Complete Phase-Strain Model for Structurally Embedded Interferometric Optical Fiber Sensors" by Sirkis et al. in the *Journal of Intelligent Material Systems and Structures*, vol. 2, pages 3–24 (1991). The latter paper describes both surface mounted and embedded sensors in many strain field configurations.

There are several drawbacks to optical fiber strain sensors using known techniques. First, the phenomenon has only begun to be investigated and the theoretical underpinnings are not fully understood. Second, the shifting of patterns can be complex and requires either an intelligent detector, or careful alignment of a detector with a pattern produced for a given amount of strain. Third, strain is measured over the entire length of the optical fiber with the result that it is difficult to mount an optical strain sensor to measure strain at a discrete location.

SUMMARY OF THE INVENTION

An object of the present invention is to provide an optical fiber strain sensor which measures strain easily. The above object is attained by providing a strain sensor, comprising: a two-mode optical fiber constructed of materials producing an intermodal phase difference $\delta\phi_{01}-\phi_{11}$ of 0.17 radians when subjected to stress within a measurable range of the strain sensor; light supply means for supplying light to a first end of the optical fiber; and light intensity detection means for detecting light intensity of a point at a second end of the optical fiber. The optical fiber may be a single mode, two mode or multi-mode fiber. The light intensity detection means may be a conventional photodiode or other light sensitive electronic device for converting the light intensity to an electrical signal, coupled with means for transmitting the light emerging from the point at the second end of the optical fiber to the photodiode or other device. The means for transporting may be a lens, an optical fiber not subjected to strain, or a strain insensitive optical fiber as disclosed in the corresponding patent application.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Figure 1:
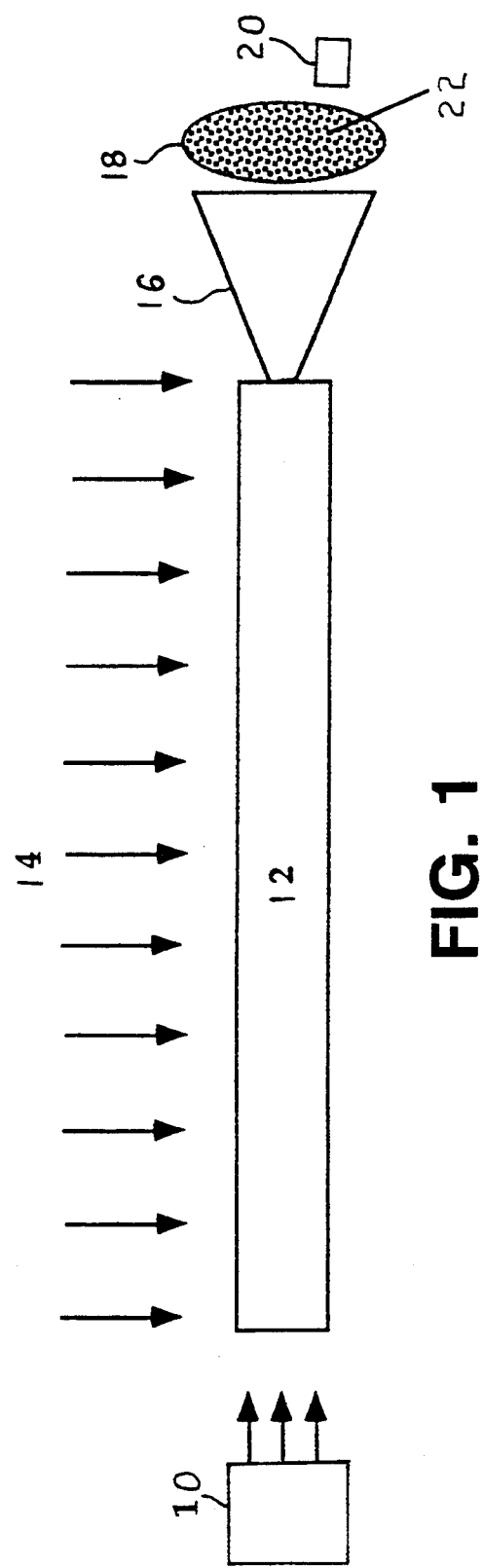
FIG. 1 is a block diagram of a strain sensor according to the present invention.

For a surface mounted straight circular optical fiber having a step index profile which is under axial strain, the normalized phase difference, $\delta\phi/kLS_1$ is defined as $$\frac{\delta\phi_{ln}}{kLS_1} = \frac{\beta_{ln}}{k} + \tag{1}$$

$$\left(\frac{U_{ln}^2 n_{cla}^2}{a^2 \beta_{ln}} - \beta_{ln} n_{co}^2\right)\frac{P_{ef}}{k} - \frac{\eta_{ln} U_{ln}^2}{ka^2 \beta_{ln}}(v_f + (n_{co}^2 + n_{cla}^2)P_{ef}),$$

where $P_{ef}$ is defined as the effective strain-optic coefficient or $$P_{ef} = \frac{(P_{12} - v_f(P_{11} + P_{12}))}{2}, \tag{2}$$

$$\eta_{ln} = \frac{K_l^2}{K_{l+1}K_{l-1}}, \tag{3}$$

$\beta_{ln}$ is the propagation constant of a mode of order $l$ and rank n, $U_{ln}$ is solution to the eigenvalue equation of a weakly guiding fiber, $n_{co}$ and $n_{cla}$ are the refractive indices of the core and cladding respectively, a is the core radius, L is the length of the fiber which is under stress, $S_1$ is the value of the axial strain, $P_{11}$ and $P_{12}$ are the strain optic coefficient, $v_f$ is the Poisson ratio and $K_l$ is the modified Bessel function of second kind of order $l$ with argument given by $$W_{ln} = \sqrt{V^2 - U_{ln}^2}, \tag{4}$$

where $$V = ak\sqrt{n_{co}^2 - n_{cla}^2}. \quad (5)$$

By writing $n_{cla}$ in terms of the parameter $\Delta$ $$\Delta = \frac{n_{co}^2 - n_{cla}^2}{2n_{co}^2}, \quad (6)$$

expressing the propagation constant in terms of $n_{co}$, $\Delta$, $U_{ln}$, $V$ and the wavenumber $k$, i.e., $$\beta_{ln} = kn_{co}\sqrt{1 - 2\Delta\frac{U_{ln}^2}{V^2}} \quad (7)$$

and expanding equation (1) to first order in $\Delta$ around $\Delta=0$, a simpler expression for the phase shift of a weakly guiding fiber ($\Delta < 0.01$) is obtained:

$$\frac{\delta\phi_{ln}}{kLS_1} = \quad (8)$$

$$n_{co} - n_{co}^3 P_{ef} + \Delta n_{co}\frac{U_{ln}^2}{V^2}(n_{co}^2(3 - 4\eta_{ln})P_{ef} - 1 - 2\nu_f\eta_{ln}). \quad (10)$$

The term on the left-hand side of equation (8) is the normalized phase shift, $\delta\phi_{nor}$. It is a function of five parameters, namely, $n_{co}$, $\Delta$, $V$, $\nu_f$ and $P_{ef}$ with strong dependence of the normalized phase shift on the core refractive index, $n_{co}$.

Two mode optical fibers have been used as modal domain sensors for measuring strain. In order to determine the strain in the fiber, the intensity of the fiber's output pattern is monitored. The resulting pattern is determined by the interference of the $LP_{01}$ and $LP_{11}$ modes and their respective phase shifts. If one neglects the effect of mode coupling, the intensity of the mode pattern with phase shift can be written as a proportionality $$I \propto \cos(\delta\beta + \delta\phi_{01} - \delta\phi_{11}) \quad (9)$$

where $\delta\beta$ is the difference between the propagation constants of the $LP_{01}$ and $LP_{11}$ modes and $\delta\phi_{01}$ and $\delta\phi_{11}$ their respective phase shifts. For a two mode fiber modal domain sensor, the term that determines the sensitivity to strain is the difference between the phase shifts of the two modes, i.e., $\delta\phi_{01}-\delta\phi_{11}$. It can be written as $$\delta\phi_{01} - \delta\phi_{11} = \quad (10)$$

$$n_{co}\frac{\Delta kLS_1}{V^2}\sum_{l=0}^{1}(-1)^{l+1}U_{l1}^2(1 + 2\eta_{l1}\nu_f - (3 - 4\eta_{l1})n_{co}^2 P_{ef})$$

From analysis of equation (9), it has been determined that when the phase difference between the two modes, i.e., $\delta\phi_{01}-\delta\phi_{11}$ is less than 0.17 radians, the intensity of any point at the output end of an optical fiber used as a strain sensor will be linear with respect to strain over a wide range of strain. The following proportionality holds.

$$I \propto \cos(\delta\beta + \delta\phi_{01} - \delta\phi_{11}) \quad (11)$$

For $\delta\phi_{01}-\delta\phi_{11}$, the right-hand side of the above proportionality can be written as $$\cos(\delta\beta)\cos(\delta\phi_{01}-\delta\phi_{11}) - \sin(\delta\beta)\sin(\delta\phi_{01}-\delta\phi_{11})$$

which is approximately $$\cos(\delta\beta) - (\delta\phi_{01}-\delta\phi_{11})\sin(\delta\beta).$$

The term $(\delta\phi_{01}-\delta\phi_{11})$ is linear with strain, consequently, for $(\delta\phi_{01}-\delta\phi_{11}) \leq 0.17$ radians, the intensity I is also linear with respect to strain.

An optical fiber having a phase difference, $\delta\phi_{01}-\delta\phi_{11}=0.17$ radians in a predetermined range of strain can be used in a strain sensor constructed as illustrated in FIG. 1. A light source 10 supplies light to the optical fiber 12 which is exposed to axial strain represented by arrows 14. The output 16 from the optical fiber 12 produces a pattern 18. A light sensitive element 20, such as a photodiode, may be positioned to detect the intensity of light at any point, e.g., point 22, in the pattern 18. The photodiode or other light intensity detection unit 20 may be mounted directly on the output end of the fiber 12, or a lens or other apparatus may be used to focus or transport the output of the fiber 12 to the element 20.

The apparatus illustrated in FIG. 1 for a fiber 12 having the characteristics described above, is capable of measuring small vibrations in a space frame without requiring a sophisticated detector for alignment of the detector to distinguish between patterns output from the fiber. Strain in a non-axial direction will be approximated as axial strain for up to 10° of deflection from the original axis of one end of the fiber measured at the other end of the fiber.

The many features and advantages of the present invention are apparent from the detailed specification, and thus it is intended by the appended claims to cover all such features and advantages of the apparatus which fall within the true spirit and scope of the invention. Further, since numerous modifications and changes will readily occur to those skilled in the art from the disclosure of this invention, it is not desired to limit the invention to the exact construction and operation illustrated and described, accordingly, suitable modifications and equivalents may be resorted to, as falling within the scope and spirit of the invention.

We claim:

1. A strain sensor, comprising:
   a two-mode optical fiber constructed of materials producing an intermodal phase difference $\delta\phi_{01}-\delta\phi_{11}$ of less than 0.17 radians when subjected to stress within a measurable range of the strain sensor;
   light supply means for supplying light to a first end of said optical fiber; and
   light intensity detection means for detecting light intensity of the point at a second end of said optical fiber.

2. A strain sensor as recited in claim 1, wherein said light intensity detection means comprises:
   conversion means for converting the light intensity to an electrical signal; and
   means for transporting light emerging from the point at the second end of said optical fiber to said conversion means.

3. A strain sensor as recited in claim 1, wherein said optical fiber is constructed of material which when subjected to strain within a predetermined range has characteristic parameters for $\delta\phi_{01}-\delta\phi_{11}$ to be less than 0.17 radians when defined as $$\delta\phi_{01} - \delta\phi_{11} = n_{co}\frac{\Delta kLS_1}{V^2} \sum_{l=0}^{1} (-1)^{l+1}U_{l1}^2(1 + 2\eta_{l1}\nu_f - (3 - 4\eta_{l1})n_{co}^2 P_{ef}),$$

where $n_{co}$ represents the refractive index of the core, k represents the wavenumber of the light, L represents the length of said optical fiber, $S_1$ represents axial strain, V is $$ak\sqrt{n_{co}^2 - n_{cla}^2},$$

U is a solution to the eigenvalue equation of said optical fiber, $\nu_f$ represents the Poisson ratio, $P_{ef}$ represents the effective strain-optic coefficient of said optical fiber and $n_{ln}$ represents $$\eta_{ln} = \frac{K_l^2}{K_{l+1}K_{l-1}},$$

where $K_l$ is the modified Bessel function of second kind of order $l$ with argument given by $$W_{ln} = \sqrt{V^2 - U_{ln}^2},$$

where $$V = ak\sqrt{n_{co}^2 - n_{cla}^2}.$$

4. A strain sensor, comprising:
a single mode optical fiber constructed of materials producing a phase of a fundamental mode $\delta\phi_{01}$ of less than 0.17 radians when subjected to stress within a measurable range of the strain sensor;
light supply means for supplying light to a first end of said optical fiber; and
light intensity detection means for detecting light intensity of the point at a second end of said optical fiber.

* * * * *